US012525136B2

United States Patent
Ishihara et al.

(10) Patent No.: US 12,525,136 B2
(45) Date of Patent: Jan. 13, 2026

(54) AVIONIC SYSTEM AND METHOD FOR SELECTIVELY PREVENTING AND ENHANCED GROUND PROXIMITY WARNING SYSTEM ALERT MODE FROM GENERATING AN ALERT

(71) Applicant: HONEYWELL INTERNATIONAL INC., Charlotte, NC (US)

(72) Inventors: Yasuo Ishihara, Phoenix, AZ (US); Supratik Gon, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 295 days.

(21) Appl. No.: 18/480,672

(22) Filed: Oct. 4, 2023

(65) Prior Publication Data

US 2024/0411323 A1 Dec. 12, 2024

Related U.S. Application Data

(60) Provisional application No. 63/506,974, filed on Jun. 8, 2023.

(51) Int. Cl.
*G08G 5/52* (2025.01)
*B64D 45/04* (2006.01)
(Continued)

(52) U.S. Cl.
CPC .............. *G08G 5/52* (2025.01); *B64D 45/04* (2013.01); *G05D 1/652* (2024.01); *G08G 5/55* (2025.01); *G06F 2117/02* (2020.01)

(58) Field of Classification Search
CPC .. G08G 5/57; G08G 5/21; G08G 5/52; G08G 5/55; G08G 5/74; G08G 5/80;
(Continued)

(56) References Cited

U.S. PATENT DOCUMENTS 3,934,222 A 1/1976 Bateman et al.
3,944,968 A 3/1976 Bateman et al.
(Continued)

FOREIGN PATENT DOCUMENTS

CN 102737525 A 10/2012
CN 105741613 A 7/2016
(Continued)

*Primary Examiner* — Jason Holloway
*Assistant Examiner* — Benjamin J Brosh
(74) *Attorney, Agent, or Firm* — Ingrassia Fisher & Lorenz, LLP

(57) ABSTRACT

A system and method for selectively preventing an alert mode implemented in an enhanced ground proximity warning system (EGPWS) from generating an alert includes retrieving from a cruise altitude data source, using the EGPWS, cruise altitude data that is indicative of a cruise altitude of an aircraft, and retrieving from a take-off altitude data source, using the EGPWS, take-off altitude data this is indicative of a take-off altitude of the aircraft. The cruise altitude data and the take-off altitude data are processed in the EGPWS to determine if the cruise altitude is below the altitude from which the aircraft is taking off. When the cruise altitude is below the altitude from which the aircraft is taking off, the alert mode implemented in the EGPWS is prevented from generating the alert until the aircraft is at the cruise altitude.

17 Claims, 3 Drawing Sheets

(51) Int. Cl.
*G05D 1/652* (2024.01)
*G08G 5/55* (2025.01)
*G06F 117/02* (2020.01)

(58) Field of Classification Search
CPC .... G05D 1/652; G05D 1/0661; G05D 1/0653; B64D 45/00; B64D 45/04; G01C 5/005; G06F 2117/02
See application file for complete search history.

(56) References Cited

U.S. PATENT DOCUMENTS

| | | | |
|---|---|---|---|
| 3,946,358 A | 3/1976 | Bateman | |
| 4,027,838 A | 6/1977 | Barnum et al. | |
| 4,293,840 A | 10/1981 | Hadari | |
| 4,951,047 A * | 8/1990 | Paterson | G01P 1/10 340/963 |
| 5,260,702 A * | 11/1993 | Thompson | G01S 13/913 340/963 |
| 5,283,574 A * | 2/1994 | Grove | G01C 5/005 340/963 |
| 5,666,110 A | 9/1997 | Paterson | |
| 6,785,594 B1 * | 8/2004 | Bateman | G01S 19/45 701/9 |
| 11,348,468 B1 * | 5/2022 | Smith | B64D 43/00 |
| 2013/0106623 A1 * | 5/2013 | Ishihara | B64D 45/04 340/970 |

FOREIGN PATENT DOCUMENTS

| | | |
|---|---|---|
| CN | 105913694 A | 8/2016 |
| DE | 3417829 A1 | 11/1984 |

* cited by examiner

AVIONIC SYSTEM AND METHOD FOR SELECTIVELY PREVENTING AND ENHANCED GROUND PROXIMITY WARNING SYSTEM ALERT MODE FROM GENERATING AN ALERT

CROSS-REFERENCE TO RELATED APPLICATION

The present application claims benefit of prior filed U.S. Provisional Patent Application No. 63/506,974, filed Jun. 8, 2023, which is hereby incorporated by reference herein in its entirety.

TECHNICAL FIELD

The present disclosure generally relates to aircraft avionics systems and, more particularly, relates to an avionic system and method that selectively prevents an enhanced ground proximity warning system alert mode from generating an alert.

BACKGROUND

Many aircraft are equipped with an enhanced ground proximity warning system (EGPWS). As is generally known, the EGPWS uses various aircraft inputs and one or more data sources to predict and warn flight crews of potential conflicts with obstacles or terrain, thereby significantly reducing the risk of controlled flight into terrain. As is also generally known, most EGPWS are configured to implement a plurality of alert modes. Indeed, some EGPWS include up to seven alert modes. These seven alert modes include: Mode 1—Excessive Descent Rate; Mode 2—Excessive Closure to Terrain; Mode 3—Altitude Loss After Takeoff; Mode 4—Unsafe Terrain Clearance; Mode 5—Excessive Deviation Below Glideslope; Mode 6—Advisory Callouts; and Mode 7—Windshear Alerting.

No matter the specific number of alert modes implemented within an EGPWS, each typically includes at least the above-mentioned Mode 3 alert mode. This alert mode, as was just alluded to, generates an alert if the aircraft descends during a take-off flight phase of the aircraft. As may be appreciated, some aircraft, such as various rotorcraft, urban air mobility (UAM) vehicles, and unmanned air vehicles (UAVs), may face a scenario in which it will take-off from a location having an altitude that is higher than the preferred or allowed cruise altitude of the aircraft. In such scenarios, the aircraft will need to descend shortly after take-off to attain the preferred or allowed cruise altitude. This, in turn, would trigger a Mode 3 alert. As may also be appreciated, receiving a Mode 3 alert under this scenario is undesirable, since it is both unnecessary and potentially distracting to the pilot.

Hence, there is a need to provide a system and method that will selectively prevent an EGPWS alert mode from generating its alert. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an avionic system for an aircraft includes a cruise altitude data source, a take-off altitude data source, and an enhanced ground proximity warning system. The cruise altitude data source is configured to supply cruise altitude data that is indicative of a cruise altitude for the aircraft. The take-off altitude data source is configured to supply take-off altitude data that is indicative of an altitude from which the aircraft will be taking off. The enhanced ground proximity warning system is configured to implement at least an alert mode that generates an alert if the aircraft descends during a take-off flight phase of the aircraft. The enhanced ground proximity warning system in operable communication with the cruise altitude data source and the take-off altitude data source and is configured to: retrieve the cruise altitude data from the cruise altitude data source; retrieve the take-off altitude of from the take-off altitude data source; process the cruise altitude data and the take-off altitude data to determine if the cruise altitude is below the altitude from which the aircraft is taking off, and when the cruise altitude is below the altitude from which the aircraft is taking off, preventing the alert mode from generating the alert during the descent to the target cruise altitude and until the aircraft is substantially at the cruise altitude.

In another embodiment, a method for selectively preventing an alert mode implemented in an enhanced ground proximity warning system from generating an alert includes retrieving from a cruise altitude data source, using the enhanced ground proximity warning system, cruise altitude data that is indicative of a cruise altitude of an aircraft, and retrieving from a take-off altitude data source, using the enhanced ground proximity warning system, take-off altitude data this is indicative of a take-off altitude of the aircraft. The cruise altitude data and the take-off altitude data are processed in the enhanced ground proximity warning system to determine if the cruise altitude is below the altitude from which the aircraft is taking off. When the cruise altitude is below the altitude from which the aircraft is taking off, the alert mode implemented in the enhanced ground proximity warning system is prevented from generating the alert until the aircraft is substantially at the cruise altitude.

In another embodiment, a computer-readable medium has computer-executable instructions stored thereon that, when executed by an enhanced ground proximity warning system, cause the enhanced ground proximity warning system to retrieve cruise altitude data from a cruise altitude data source, the cruise altitude data indicative of a cruise altitude of an aircraft; retrieve take-off altitude data from a take-off altitude data source, the take-off altitude data indicative of a take-off altitude of the aircraft; process the cruise altitude data and the take-off altitude data to determine if the cruise altitude is below the altitude from which the aircraft is taking off; and when the cruise altitude is below the altitude from which the aircraft is taking off, prevent an alert mode implemented in the enhanced ground proximity warning system from generating an alert until the aircraft is substantially at the cruise altitude.

Furthermore, other desirable features and characteristics of the system, method, and computer-readable medium will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
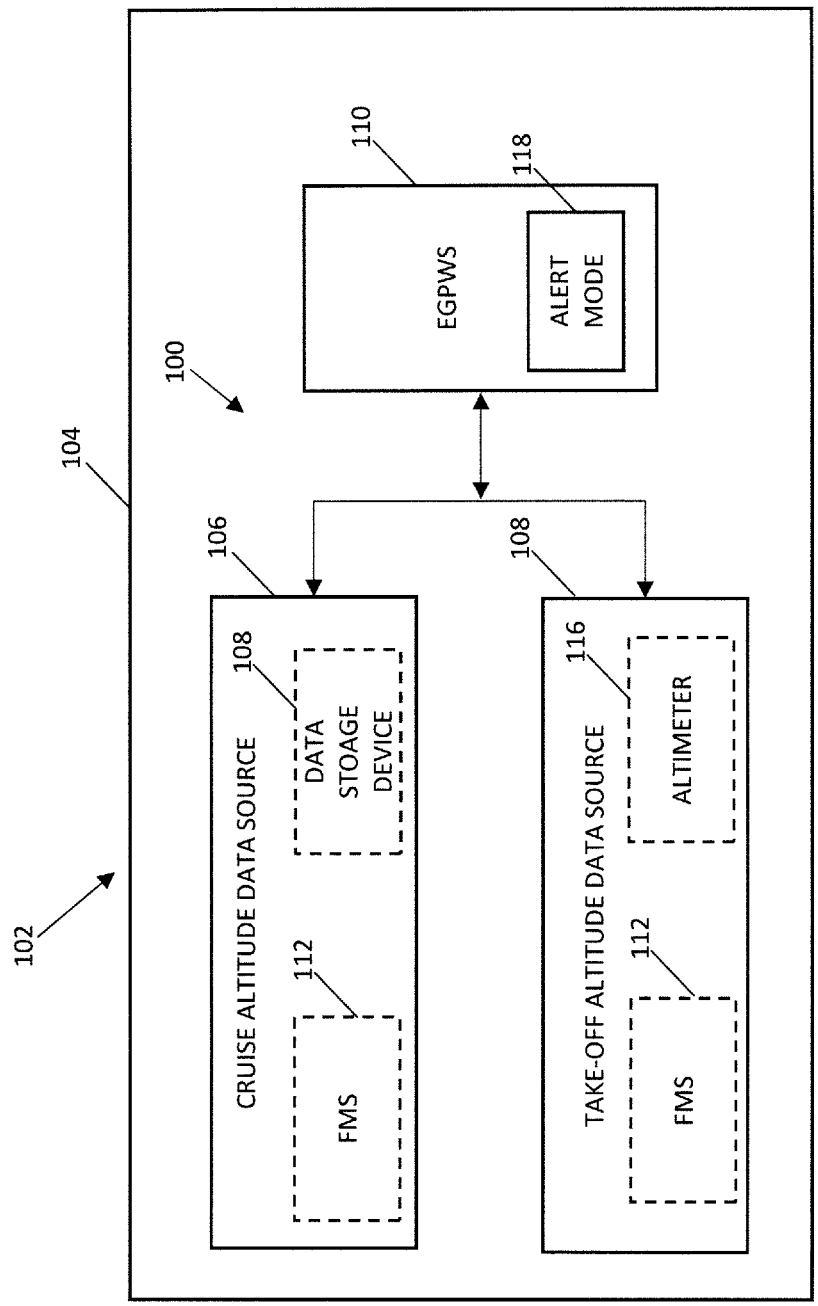
FIG. 1 a functional block diagram of one embodiment of an avionic system.

Referring to FIG. 1, a functional block diagram of one embodiment of an avionic system 100 is depicted. The system 100 is disposed at least partially on or within an aircraft 102, and more specifically on or within the aircraft fuselage 104, and includes at least a cruise altitude data source 106, a take-off altitude data source 108, and an enhanced ground proximity warning system 110. The cruise altitude data source 106 may be disposed within or remote from the aircraft 102 and is configured to supply cruise altitude data that is indicative of the cruise altitude for the aircraft 102. The cruise altitude data source 106 may be variously implemented. For example, it may be implemented as part of the aircraft flight management system (FMS) 112. In such embodiments, the cruise altitude data may comprise, for example, part of the aircraft flight plan. In other embodiments, the cruise altitude data source 106 may be implemented as, or within, a data storage device 114 that stores airspace data indicative of a maximum allowed cruise altitude for the aircraft 102.

The take-off altitude data source 108 may also be disposed within or remote from the aircraft 102 and is configured to supply take-off altitude data that is indicative of the altitude from which the aircraft 102 will be taking off. The take-off altitude data source 108 may also be variously implemented. For example, in one embodiment it comprises an aircraft altimeter 116. In another embodiment, it too may be implemented as part of the FMS 112. In such embodiments, the take-off altitude data may comprise, for example, part of the aircraft flight plan.

Before proceeding further, it is noted that if either or both of the cruise altitude data source 106 or the take-off altitude data source 108 are disposed remote from the aircraft 102, the particular data that each supply may be transmitted to the aircraft 102, and more specifically, transmitted (either directly or indirectly) to the enhanced ground proximity warning system 100

Returning to the description, the enhanced ground proximity warning system 110 is configured to implement one or more alerting modes. In particular, it may implement seven alerting modes. In the depicted embodiment, the enhanced ground proximity warning system 110 is configured to implement at least an alert mode 118 that generates an alert if the aircraft descends during a take-off flight phase of the aircraft (sometimes referred to as Mode 3).

No matter the specific number of alerting modes, the enhanced ground proximity warning system 110 is in operable communication with the cruise altitude data source 106 and the take-off altitude data source 108 and is configured to retrieve the cruise altitude data from the cruise altitude data source 106 and the take-off altitude of from the take-off altitude data source 108. The enhanced ground proximity warning system 110 is additionally configured to process the cruise altitude data and the take-off altitude data to determine if the cruise altitude is below the altitude from which the aircraft 102 is taking off. The enhanced ground proximity warning system 110 is further configured, upon determining that the cruise altitude is below the altitude from which the aircraft 102 is taking off, to prevent the alert mode 118 from generating the alert at least until the aircraft is substantially at the cruise altitude. As used herein, substantially means at or within a predetermined altitude margin of the cruise altitude. It will be appreciated that the predetermined altitude margin may vary. One suitable example of the predetermined altitude margin is 50 feet.

It will be appreciated that the manner in which the enhanced ground proximity warning system 110 prevents the alert mode 118 from generating the alert may vary. For example, in one embodiment the enhanced ground proximity warning system 110 is configured to prevent the alert mode 118 from generating the alert by disabling the alert mode 118. In another embodiment, the enhanced ground proximity warning system 110 is configured to prevent the alert mode 118 from generating the alert by commanding the alert mode 118 to not generate the alert.

Figure 2:
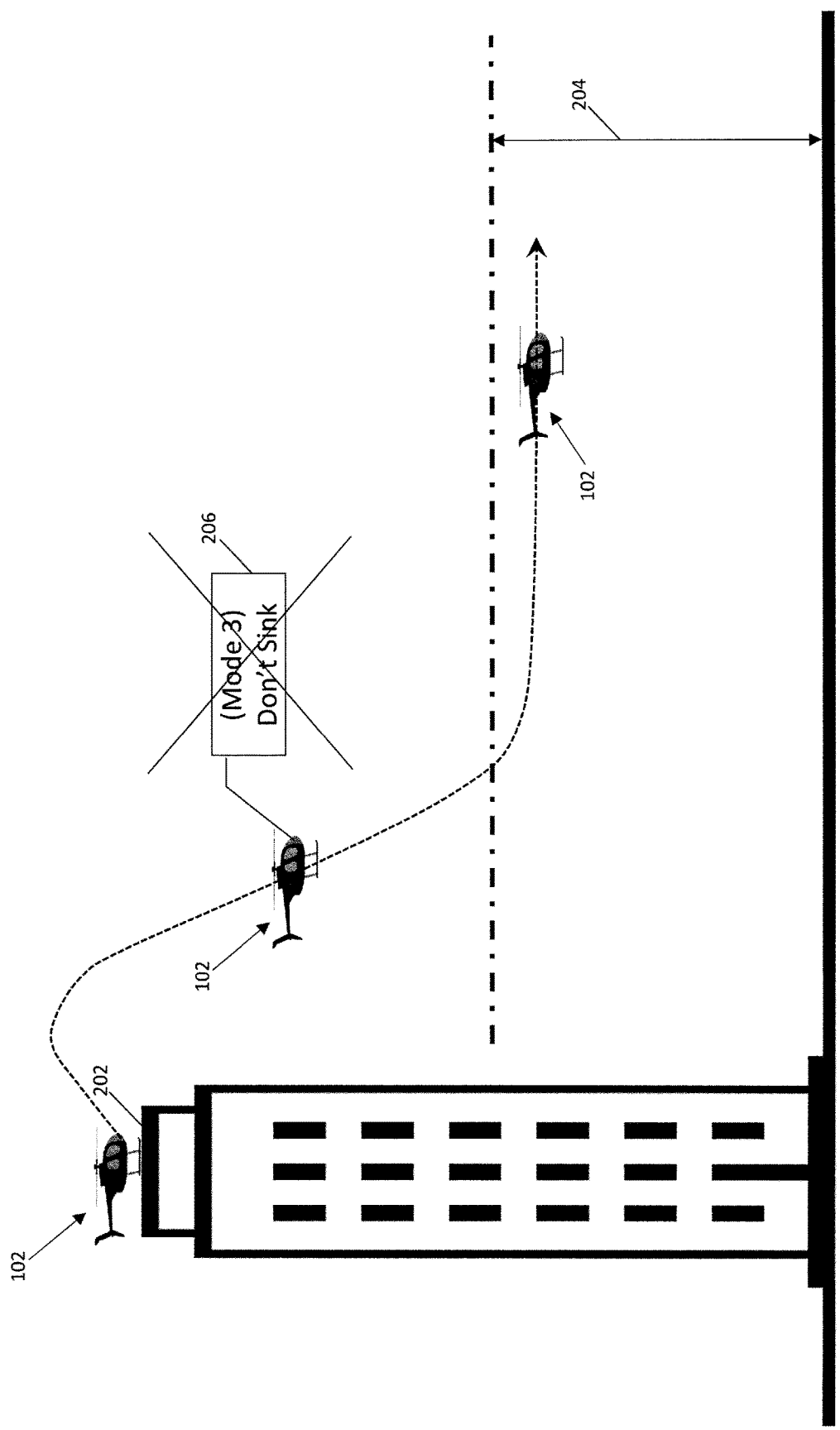
FIG. 2 depicts a scenario in which the system of FIG. 1 may prevent an alert mode.

Referring now to FIG. 2, an example scenario is depicted in which it is desirable to prevent the alert mode 118 from generating the alert. As depicted in FIG. 2, the aircraft is going to take-off from a location (e.g., building-top heliport) 202 that is above the intended or maximum allowed cruise altitude 204 of the aircraft 102. As such, shortly after take-off the aircraft 102 will begin to descend toward this lower cruise altitude 204. However, the aircraft operator will not receive the alert 206 typically generated during this scenario (e.g., Mode 3—"Don't Sink!") since the enhanced ground proximity warning system 110 has prevented this alert 206. However, when the aircraft 102 has attained (e.g., is substantially at) the cruise altitude 204, the alert mode is no longer prevented from generating the alert.

Figure 3:
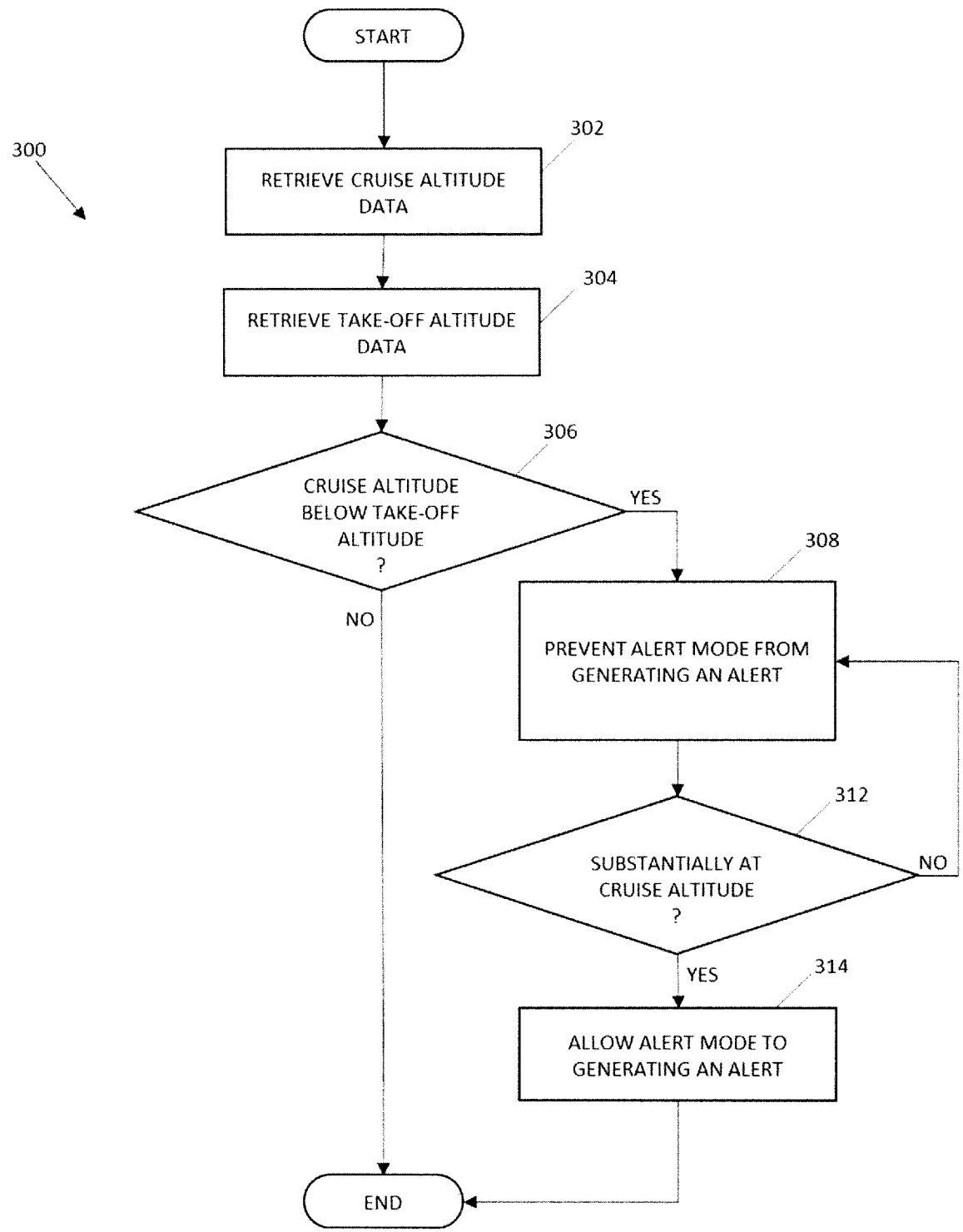
FIG. 3 a process, in flowchart form, of a method that may be implemented in the system of FIG. 1.

Having described the overall functionality of the system 100, a description of a method for method that selectively preventing an alert mode implemented in an enhanced ground proximity warning system 110 from generating an alert will now be described. The method 300, which is depicted in flowchart form in FIG. 3, represents various embodiments of a method for selectively preventing an alert mode implemented in an enhanced ground proximity warning system 110 from generating an alert. For illustrative purposes, the following description of method 300 may refer to elements mentioned above in connection with FIG. 1. In practice, portions of method 300 may be performed by different components of the described system 100. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

The method 300 starts and the enhanced ground proximity warning system 100 retrieves the cruise altitude data from the cruise altitude data source 106 (302), and retrieves the take-off altitude data from the take-off altitude data source 108 (304). The enhanced ground proximity warning system 110 then processes the cruise altitude data and the take-off altitude data to determine if the cruise altitude is below the altitude from which the aircraft is taking off (306). If not, the process ends. However, when the cruise altitude is below the altitude from which the aircraft is taking off, the alert mode implemented in the enhanced ground proximity warning system 110 is prevented from generating the alert (308) until the aircraft is substantially at the cruise altitude (312). When the aircraft 102 is substantially at the cruise altitude, the alert mode is no longer prevented from generating the alert (314).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An avionic system for an aircraft, comprising:
a cruise altitude data source configured to supply cruise altitude data, the cruise altitude data indicative of a cruise altitude for the aircraft;
a take-off altitude data source configured to supply take-off altitude data, the take-off altitude data indicative of an altitude from which the aircraft will be taking off; and
an enhanced ground proximity warning system that implements at least an alert mode that generates an alert if the aircraft descends during a take-off flight phase of the aircraft, the enhanced ground proximity warning system in operable communication with the cruise altitude data source and the take-off altitude data source and configured to:
retrieve the cruise altitude data from the cruise altitude data source,
retrieve the take-off altitude of from the take-off altitude data source,
process the cruise altitude data and the take-off altitude data to determine if the cruise altitude is below the altitude from which the aircraft is taking off, and
when the cruise altitude is below the altitude from which the aircraft is taking off, preventing the alert mode from generating the alert until the aircraft is substantially at the cruise altitude.

2. The system of claim 1, wherein the enhanced ground proximity warning system is configured to prevent the alert mode from generating the alert by disabling the alerting mode.

3. The system of claim 1, wherein the enhanced ground proximity warning system is configured to prevent the alert mode from generating the alert by commanding the alert mode to not generate the alert.

4. The system of claim 1, wherein the cruise altitude data source comprises a flight management system (FMS).

5. The system of claim 1, wherein the cruise altitude data source comprises a data storage device that stores airspace data indicative of a maximum allowed cruise altitude for the aircraft.

6. The system of claim 1, wherein the take-off altitude data source comprises an aircraft altimeter.

7. The system of claim 1, wherein the take-off altitude data source comprises a flight management system (FMS).

8. A method for selectively preventing an alert mode implemented in an enhanced ground proximity warning system from generating an alert, the method comprising the steps of:
retrieving from a cruise altitude data source, using the enhanced ground proximity warning system, cruise altitude data that is indicative of a cruise altitude of an aircraft;
retrieving from a take-off altitude data source, using the enhanced ground proximity warning system, take-off altitude data this is indicative of a take-off altitude of the aircraft;
processing, in the enhanced ground proximity warning system, the cruise altitude data and the take-off altitude data to determine if the cruise altitude is below the altitude from which the aircraft is taking off; and
when the cruise altitude is below the altitude from which the aircraft is taking off, preventing the alert mode implemented in the enhanced ground proximity warning system from generating the alert until the aircraft is substantially at the cruise altitude.

9. The method of claim 8, further comprising disabling the alert mode to thereby prevent the alert mode from generating the alert.

10. The method of claim 8, further comprising commanding the alert mode to not generate the alert to thereby prevent the alert mode from generating the alert.

11. The method of claim 8, wherein the cruise altitude data source comprises a flight management system (FMS).

12. The method of claim 8, wherein the cruise altitude data source comprises a data storage device that stores airspace data indicative of a maximum allowed cruise altitude for the aircraft.

13. The method of claim 8, wherein the take-off altitude data source comprises an aircraft altimeter.

14. The method of claim 8, wherein the take-off altitude data source comprises a flight management system (FMS).

15. A non-transitory computer-readable medium having computer-executable instructions stored thereon that, when executed by an enhanced ground proximity warning system, cause the enhanced ground proximity warning system to:
retrieve cruise altitude data from a cruise altitude data source, the cruise altitude data indicative of a cruise altitude of an aircraft;
retrieve take-off altitude data from a take-off altitude data source, the take-off altitude data indicative of a take-off altitude of the aircraft;
process the cruise altitude data and the take-off altitude data to determine if the cruise altitude is below the altitude from which the aircraft is taking off; and
when the cruise altitude is below the altitude from which the aircraft is taking off, prevent an alert mode implemented in the enhanced ground proximity warning system from generating an alert until the aircraft is substantially at the cruise altitude.

16. The non-transitory computer-readable medium of claim 15, wherein the instructions are configurable to cause the enhanced ground proximity warning system to disable the alert mode to thereby prevent the alert mode from generating the alert.

17. The non-transitory computer-readable medium of claim 15, wherein the instructions are configurable to cause the enhanced ground proximity warning system to command the alert mode to not generate the alert to thereby prevent the alert mode from generating the alert.

\* \* \* \* \*